May 31, 1938.  J. J. DENHAM  2,119,384
AUTOMATICALLY ADJUSTING BRAKE
Filed Aug. 11, 1936
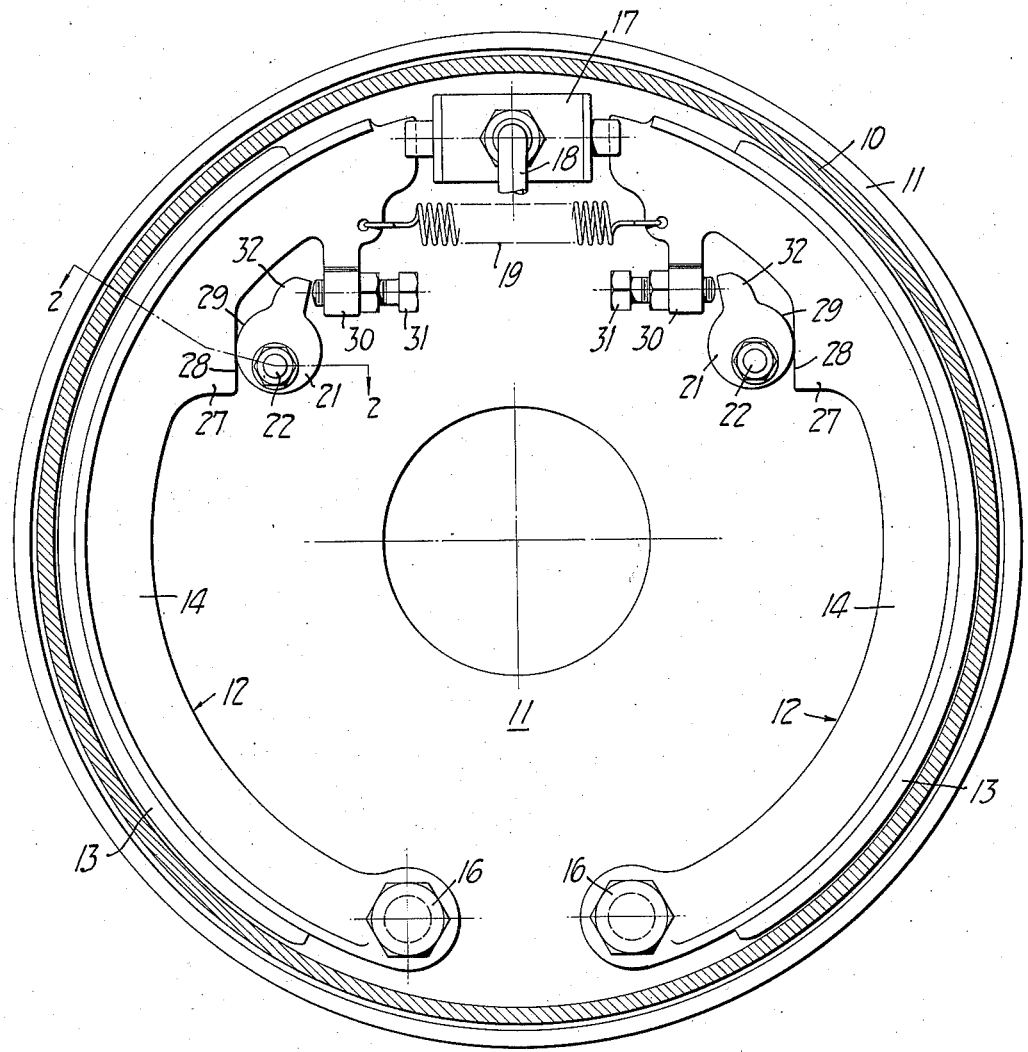
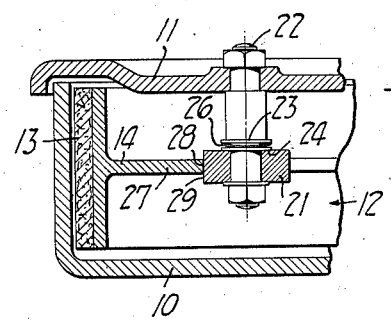
INVENTOR.
J. J. Denham
BY Paul D. Flehr
ATTORNEY.

Patented May 31, 1938

2,119,384

UNITED STATES PATENT OFFICE 2,119,384

AUTOMATICALLY ADJUSTING BRAKE

John J. Denham, Berkeley, Calif., assignor to Albert E. Jurs, Berkeley, Calif., doing business as Shand & Jurs Company Application August 11, 1936, Serial No. 95,367

3 Claims. (Cl. 188—79.5)

This invention relates generally to the construction of brakes, such as are suitable for automotive vehicles. It applies particularly to brakes incorporating automatic take-up means, to compensate for wear upon the brake lining.

It is an object of the invention to provide an improved brake of the above character, which will have a minimum number of working parts, and which will afford a high degree of reliability in carrying out its desired functions.

Another object of the invention is to provide an improved automatic take-up means particularly suited for use with hydraulic brakes of the internal type.

Further objects of the invention will appear from the following description in which the preferred embodiment of the invention has been set forth in detail in conjunction with the accompanying drawing:

Referring to the drawing:

Fig. 1 is a cross-sectional view in side elevation, showing the interior of a brake incorporating the present invention.

Fig. 2 is a cross-sectional detail taken along the line 2—2 of Fig. 1.

That form of the invention illustrated in the drawing consists of a brake drum 10, together with a conventional cover or backing plate 11. As applied to automotive vehicles, the drum 10 is secured to or forms a part of the wheel, while the backing plate 11 is secured to the vehicle. Within the brake drum 10 are the two arcuate or segmental brake shoes 12, each of which is provided with the usual lining 13, formed of fabric or molded material. In conformance with conventional designs the body of each shoe includes a web 14, to afford proper structural strength.

The mounting for the shoes, in order to enable their movement between braking and released positions, includes pivotal connections 16 to the backing plate 11. Interposed between the free ends of the shoes there is a suitable hydraulic motive unit 17, which can consist of a cylinder and a pair of pistons engaging the adjacent ends of the shoes. The cylinder is shown connected to a hose 18, which leads to a suitable hydraulic actuator for applying liquid under pressure. A tension spring 19 is shown interconnecting the free ends of the shoes, whereby the shoes are moved to released positions, after hydraulic pressure applied to hose 18 is relieved.

The automatic take-up mechanism which I employ with the parts described above, can be constructed as follows:—A pair of cams 21 are located in positions adjacent the free ends of the brake shoes. The representative form of mounting for each cam 21, illustrated in Fig. 2, consists of a stud 22, carried by the backing plate 11. Cam 21 is journalled upon the inner end of stud 22, for relative angular adjustments. Suitable frictioning means is interposed between each cam 21 and its associated stud 22, whereby for ordinary road shocks to which the brake may be subjected, the cam will maintain a fixed position. For example a pair of thrust washers 23 and 24 are shown, with the washer 23 seated upon stud 22, and washer 24 engaging one side of cam 21. Interposed between these thrust washers there is a spring washer 26, which is normally compressed within its elastic limit.

Formed upon the web 14 of each shoe there is a lug 27, the face 28 of which is adapted to engage the peripheral surface 29, of the cam 21. It is the engagement or abutment between these surfaces which determines the released positions of the two shoes, and it will be evident that because of the contour of the cam surfaces 29, which are eccentric with respect to the centers of studs 22, a change in the angular setting of the two cams will serve to adjust or vary the released positions of the two shoes.

In order to automatically adjust the angular setting of the two cams, when the shoes are actuated to braking positions, I provide simple means acting directly between each cam and its associated shoe. Thus each shoe is provided with a lug or extension arm 30, into which a set screw 31 is threaded. The end of set screw 31 is adapted to engage the face of a lug or arm 32, which is fixed to the associated cam 21.

Operation of the brake described above, can be briefly outlined as follows:—At the time the brake is assembled, which may follow application of new linings to the shoes, the cams 21 are adjusted to such angular positions as to give a proper amount of clearance between the brake lining 13 and the inner peripheral surface of the drum 10. After this adjustment has been made there should be sufficient clearance between the ends of set screws 31 and the cooperating faces of arms 32, so that the shoes can be forced to braking position, without causing a change in the angular setting of the cam. In other words for braking positions of the shoes, set screws 31 should just come into engagement with the arms 32. As the brake linings become more compressed or wear away in usage, the brake shoes will be forced into closer proximity to the inner peripheral surface of the drum, in moving to braking positions. Such movement will cause the set screws 31 to engage and move arms 32, to change the angular setting of cams 21 by compensating amounts. A change in the setting of cams 21 causes the brake shoes to stop in a different position when released, so that in effect the clearance between the brake lining and the inner periphery of the drum, remains substantially constant. With a conventional type of pedal operated hydraulic actuator, connected to the hydraulic cylinder unit 17, it will be evident that the automatic take-up thus afforded will automatically maintain the pedal movement substantially constant, throughout the life of the brake lining.

It will be evident that my brake utilizes a minimum number of working parts, thus facilitating manufacture and assembly. Assembly and adjustments of my brake can be readily made by ordinary garage mechanics, and after being properly adjusted, the brake will afford long reliable service without further manual attention.

I claim:

1. A brake comprising a brake drum, a backing plate associated with the drum, at least two segmental brake shoes, corresponding ends of said shoes being pivotally secured to the backing plate, a hydraulic motive unit connected to the free ends of said shoes and serving to actuate the same to braking positions, spring means for urging the free ends of said shoes together and towards released positions, a pair of cam elements movably carried by the backing plate and forming adjustable abutments for the released positions of said braking shoes, and means for determining the settings of said cam elements, when the shoes are moved to braking positions, said last means comprising lugs formed in said cam elements and adjustable members carried by the shoes and adapted to engage said lugs.

2. A brake comprising a brake drum, a backing plate associated with the drum, a brake shoe mounted upon the backing plate and movable between braking and released positions, means for actuating the shoe between braking and released positions, and automatic take-up means for the shoe, said means comprising a single angularly movable cam element mounted upon the backing plate, said cam element forming an adjustable abutment for determining the released position of the shoe, there being sufficient friction against angular movement between the cam element and said backing plate whereby said cam element normally maintains a fixed position with respect to the backing plate, and adjustable means for determining the setting of said cam element when the shoe is actuated to braking position, adjustment of said means serving to vary the amplitude of movement of the shoe in moving between braking and released positions.

3. A brake comprising a brake drum, a backing plate associated with the drum, a brake shoe mounted upon the backing plate and movable between braking and released positions, means for actuating the shoe between braking and released positions, and automatic take-up means for the shoe, said means comprising a single angularly movable cam element mounted upon the backing plate, said cam element forming an adjustable abutment for determining the released position of the shoe, there being sufficient friction against angular movement between the cam element and said backing plate whereby said cam element normally maintains a fixed position with respect to the backing plate, and means for determining the setting of said cam element when the shoe is actuated to braking position, said last means comprising a shoulder on the cam element and a member adjustably carried by the shoe and adapted to engage said shoulder.

JOHN J. DENHAM.